United States Patent
Rose et al.

(10) Patent No.: US 10,048,398 B2
(45) Date of Patent: *Aug. 14, 2018

(54) METHODS AND SYSTEMS FOR PALLET DETECTION (71) Applicant: X Development LLC, Mountain View, CA (US)

(72) Inventors: Robert Rose, Mountain View, CA (US); Ethan Rublee, Mountain View, CA (US)

(73) Assignee: X Development LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/338,798

(22) Filed: Oct. 31, 2016

(65) Prior Publication Data

US 2018/0120465 A1 May 3, 2018

(51) Int. Cl.
- *G01V 3/02* (2006.01)
- *G05D 1/02* (2006.01)
- *B66F 9/06* (2006.01)
- *G01C 22/00* (2006.01)

(52) U.S. Cl.
CPC ........... *G01V 3/02* (2013.01); *B66F 9/063* (2013.01); *G05D 1/021* (2013.01); *B66F 9/06* (2013.01)

(58) Field of Classification Search
CPC .. G01V 3/02; B66F 9/063; B66F 9/06; G05D 1/021
USPC .......................................................... 701/23
See application file for complete search history.

(56) References Cited

U.S. PATENT DOCUMENTS

| | | | |
|---|---|---|---|
| 6,115,114 A | 9/2000 | Berg | |
| 7,236,851 B2 | 6/2007 | Charych | |
| 7,287,625 B1 | 10/2007 | Harris | |
| 9,561,941 B1 * | 2/2017 | Watts | B66F 9/063 |
| 2011/0095087 A1 | 4/2011 | Master | |
| 2011/0218670 A1 | 9/2011 | Bell | |
| 2013/0127126 A1 | 5/2013 | Lantz et al. | |

FOREIGN PATENT DOCUMENTS

| | | |
|---|---|---|
| JP | 07-215695 A | 8/1985 |
| JP | 62-211300 A | 9/1987 |
| WO | WO 2012-169903 A2 | 12/2012 |

OTHER PUBLICATIONS

International Search Report issued in co-pending PCT/US2017/052722, Korean Intellectual Property Office, dated Dec. 15, 2017, 5 pages.

Written Opinion issued in co-pending PCT/US2017/052722, Korean Intellectual Property Office, dated Dec. 15, 2017, 11 pages

* cited by examiner

*Primary Examiner* — Gertrude Arthur Jeanglaude
(74) *Attorney, Agent, or Firm* — McDonnell Boehnen Hulbert & Berghoff LLP (57) ABSTRACT

Example implementations may relate to accurate pallet insertion. An example system may include a forklifted configured with a base and a tine coupled to the base. The tine may include a first proximity sensor positioned on a first side of the tine and a second proximity sensor positioned on a second side of the tine. The system may also include a computing system configured to receive, from the first sensor and the second sensor, sensor data indicative of proximity of the tine relative to opposing surfaces of a pocket of a pallet and navigate the forklift relative to the pallet based on the sensor data.

20 Claims, 6 Drawing Sheets

METHODS AND SYSTEMS FOR PALLET DETECTION

BACKGROUND

Commercial entities, such as manufacturers, wholesalers, and transport businesses, often use warehouses to store items, such as raw materials, parts or components, packing materials, and finished products. In particular, a warehouse enables organization of the items through use of pallet racks to store pallets holding the various items in a manner that permits for easier access and efficient processing. As such, a warehouse may use various types of pallets, which are flat transport structures configured to hold items for easier transportation by vehicles and other equipment operating in the warehouse.

Traditionally, human operators may operate machines, vehicles, and other equipment within the warehouse. For instance, a human operator may navigate a forklift to lift and transport pallets between a delivery area and storage. However, with continuous advancements in sensors, computing power, and other technologies, companies are switching to autonomous and semi-autonomous vehicles for performing operations within warehouses rather than relying on human operators.

SUMMARY

Example implementations relate to methods and systems for pallet detection, which may involve positioning one or more sensors on one or both tines of a forklift. In some implementations, the sensors coupled to a tine may measure the proximity of any object that enters within a range nearby the tine. For instance, a tine's sensors may capture measurements that indicate the distance between the tine and the sides of a pallet's pockets when the forklift inserts the tine into the pallet's pockets to lift the pallet. By using measurements from the sensors, a control system or human operator may adjust the forklift's operations to ensure a balanced and accurate lift of the pallet, which can help reduce potential damage to the pallet or pallet's items that may occur when the forklift fails to insert its tines accurately into the pallet.

In one aspect, a system is provided. The system may include a forklift having a base, and a tine coupled to the base. In some instances, the tine includes a first sensor positioned on a first side of the tine and a second sensor positioned on a second side of the tine. The system may further include a computing system configured to receive, from the first sensor and the second sensor, sensor data indicative of proximity of the tine relative to opposing surfaces of a pocket of the pallet, and adjust operation of the forklift relative to the pallet based on the sensor data.

In another aspect, a method is provided. The method may include receiving, at a computing system controlling a forklift that comprises a base and a tine coupled to the base, sensor data from a first sensor positioned on a first side of the tine and a second sensor positioned on a second side of the tine. In some instances, the sensor data can be indicative of proximity of the tine relative to opposing surfaces of a pocket of a pallet. The method may also include adjusting operation of the forklift relative to the pallet based on the sensor data.

In another aspect, a non-transitory computer readable medium is provided. The non-transitory computer readable medium has stored therein instructions executable by one or more processors to cause a computing system to perform functions. The functions may include receiving, from a first sensor positioned on a first side of a tine coupled to a base of a forklift and a second sensor positioned on a second side of the tine, sensor data indicative of proximity of the tine relative to opposing surfaces of a pocket of a pallet, and adjusting operation of the forklift relative to the pallet based on the sensor data.

These as well as other aspects, advantages, and alternatives will become apparent to those of ordinary skill in the art by reading the following detailed description, with reference where appropriate to the accompanying drawings.

DETAILED DESCRIPTION

Example methods and systems are described herein. It should be understood that the words "example," "exemplary," and "illustrative" are used herein to mean "serving as an example, instance, or illustration." Any implementation or feature described herein as being an "example," being "exemplary," or being "illustrative" is not necessarily to be construed as preferred or advantageous over other implementations or features. The example implementations described herein are not meant to be limiting. It will be readily understood that the aspects of the present disclosure, as generally described herein, and illustrated in the figures, can be arranged, substituted, combined, separated, and designed in a wide variety of different configurations, all of which are explicitly contemplated herein.

When transporting a pallet within a space, a forklift can potentially damage the pallet or pallet's items if the forklift fails to initially pick up and secure the pallet properly. Especially with dangerous or fragile items, it is important that the initial insertion of the forklift's tines, also referred to as elongated tines, into the pallet permits a balanced, full supported lift of the pallet. When the forklift inserts the tines into the pockets of the pallet imprecisely, the forklift may drop the pallet or otherwise possibly damage items. For instance, if the forklift inserts the tines at an improper orientation or substantially off-center, the pallet may shift and fall off during transportation due to an uneven distribution of the pallet's weight upon the forklift's tines. Additionally, in some instances, a pallet may be damaged and not safe for pickup by a forklift. Failure to detect a damaged pallet can also result in damaging items placed on the pallet.

A human operator can often correct an inaccurate placement of the forklift's tines before the forklift damages items on the pallet. Particularly, the human operator may feel an imbalance of the pallet on the forklift's tines after an initial lift and readjust the tines within the pallet's pockets to improve the orientation and positioning of the tines relative to the pallet. Similarly, the human operator may also notice when a pallet appears damaged and refrain from engaging the pallet with the forklift. However, with recent improvements in sensors, computing, and other technologies, many warehouses and other types of spaces are starting to rely upon autonomous or semi-autonomous forklifts and other vehicles to perform tasks previously performed by human operators. More specifically, many companies are using autonomous and semi-autonomous forklifts and other vehicles to manipulate and transport pallets throughout the space. Although autonomous and semi-autonomous forklifts and other types of vehicles can help make pallet transportation more efficient, these vehicles can no longer depend on the skills of a human operator to prevent potential damage that may occur to pallets and items as a result of improper positioning or orientation during transportation.

Disclosed herein are example methods and systems for pallet detection that can help reduce unwanted damage to a pallet or pallet's items that can occur from improper insertion of a forklift's tines. As an example implementation, a forklift's tines may include sensors positioned on the sides of the tines that can provide proximity measurements of any objects that enter into a position nearby the tines. Particularly, the sensors can measure the proximity of the sides of a pallet's pockets relative to the tines when the forklift inserts the tines to lift the pallet. With this configuration, the sensors can relay measurements to a control system (e.g., a computing system) controlling the forklift that can use the measurements to adjust operation of the forklift to ensure a balanced lift of the pallet when necessary. For instance, the computing system may cause the forklift to adjust the orientation of the tines relative to the pallet's pockets based on incoming sensor measurements. In some cases, the computing system may even cause the forklift to completely redo the insertion of the tines into the pallet's pockets prior to lifting the pallet based on measurements from the sensors positioned on the tines.

In a further implementation, a forklift's tines may include an array of capacitive sensors arranged in intervals along the exterior sides of each tine. For example, each tine may include multiple sensors positioned on each exterior side of the tine with gaps between each sensor. As such, the array of capacitive sensors can measure the proximity of the opposing sides of the pockets of a pallet when the forklift inserts the tines into the pallet and provide the measurements to a control system for processing. With this configuration, the sensors may provide an indication to the control system of the forklift when the tines are not positioned properly for lifting the pallet (e.g., the sensors can indicate that the tines entered into the pallet at the wrong angle or improper position). As a result, the forklift's control system may determine that adjusting the orientation of the tines relative to the pallet is required to prevent potential damage to the pallet or items.

In some instances, the sensors may also indicate to the control system or a human operator if there may be internal damage to the pallet that may not be externally visible. For instance, measurements from one or more sensors positioned on a tine of the forklift may indicate internal damage of the pallet's pockets. As a result, a control system of the forklift may abort and refrain from lifting the pallet based on the sensor measurements. With sensors positioned on one or more tines of the forklift, the control system and/or a human operator may receive measurements that indicate the internal condition of the pallet. For instance, the sensors may indicate that a base of the pallet has sustained some damage and the pallet should remain stationary rather than lifted.

In another implementation, sensors coupled to the forklift's tines may relay measurements to an interface for a human operator to use. For instance, the forklift may include a visual output that allows the human operator to see proximity measurements from the sensors as the human operator drives the forklift's tines into a pallet's pockets. This way, the human operator may adjust control of the forklift based on proximity measurements from the tines' sensors to ensure an insertion that enables a balanced lift of the pallet.

In a further implementation, a system of the forklift may relay sensor measurements from the forklift's tines to a remote control system or human operator. For instance, the control system may send sensor measurements to a remote human operator that may assist in controlling the forklift and/or detect pallet damage based on the measurements. In some instances, the remote human operator and/or remote control system may determine that the forklift should refrain from lifting the pallet based on the measurements indicating internal damage to the pockets of the pallet and/or improper orientation of the tines relative to the pallet. The system of the forklift may relay information to a remote entity via the Internet or other types of wireless connections. In some instances, the control system may send information to a remote entity (e.g., a remote human operator) to confirm or cancel a subsequent operation (e.g., the remote human operator causes the control system of the forklift to abort lifting a damaged pallet).

Within implementations, sensors can have various placements on a forklift's tines. For instance, in an implementation, a tine may include sensors positioned only along the inner and outer sides of the tine. As such, the tine can include a single sensor positioned on each side or can further include multiple sensors extending along the length of the sides. In another implementation, a forklift's tine may include sensors positioned along the sides, end, top, and/or bottom of the tine. In addition, the size, spacing, type, and/or other parameters of the sensors can vary within examples. For instance, a tine can include multiple types of sensors configured to capture measurements for use to adjust operation of the forklift. The different types of sensors can provide a control system and/or human operator with a variety of information for improving pallet detection.

Figure 1:
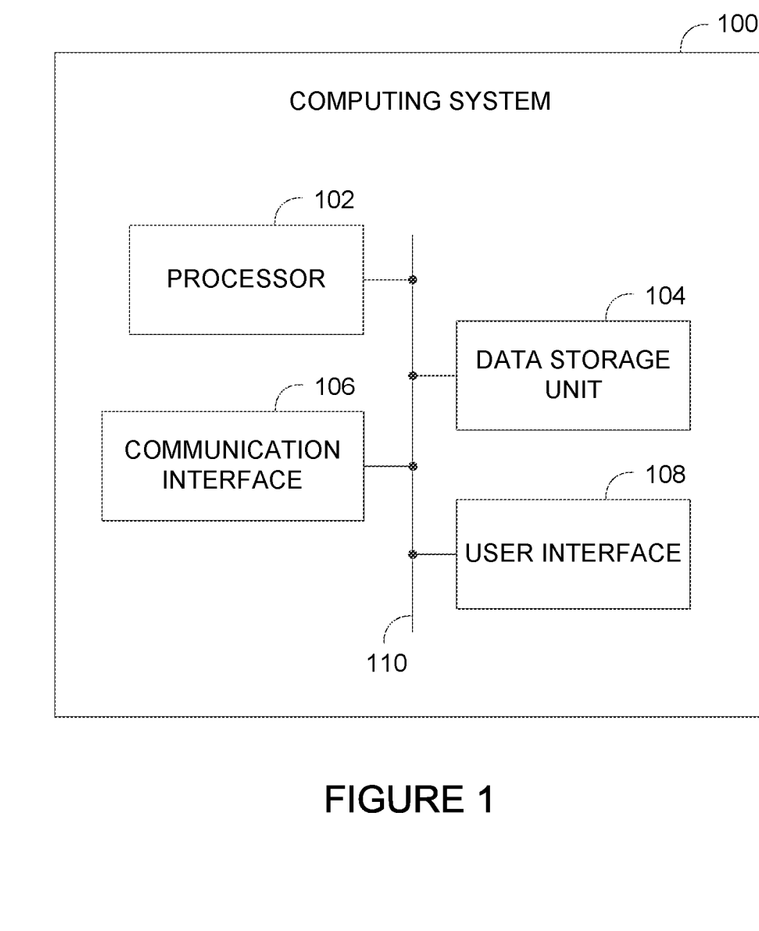
FIG. 1 is a simplified block-diagram of an example computing system.

Referring now to the figures, FIG. 1 is a simplified block-diagram of an example computing system 100 that can perform various acts and/or functions, such as those described in this disclosure. Computing system 100 can serve as a control system for an autonomous or semi-autonomous vehicle, such as a forklift or robotic device, and can include various components, such as processor 102, data storage unit 104, communication interface 106, and/or user interface 108. These components as well as other possible components can connect to each other (or to another device, system, or other entity) via connection mechanism 110, which represents a mechanism that facilitates communication between two or more devices, systems, or other entities. As such, connection mechanism 110 can be a simple mechanism, such as a cable or system bus, or a relatively complex mechanism, such as a packet-based communication network (e.g., the Internet). In some instances, a connection mechanism can include a non-tangible medium (e.g., where the connection is wireless). In a further implementation, computing system 100 can include more or less components.

Processor 102 may correspond to a general-purpose processor (e.g., a microprocessor) and/or a special-purpose processor (e.g., a digital signal processor (DSP)). In some instances, computing system 100 may include a combination of processors.

Data storage unit 104 may include one or more volatile, non-volatile, removable, and/or non-removable storage components, such as magnetic, optical, or flash storage, and/or can be integrated in whole or in part with processor 102. As such, data storage unit 104 may take the form of a non-transitory computer-readable storage medium, having stored thereon program instructions (e.g., compiled or non-compiled program logic and/or machine code) that, when executed by processor 102, cause computing system 100 to perform one or more acts and/or functions, such as those described in this disclosure. Computing system 100 can be configured to perform one or more acts and/or functions, such as those described in this disclosure. Such program instructions can define and/or be part of a discrete software application. In some instances, computing system 100 can execute program instructions in response to receiving an input, such as from communication interface 106 and/or user interface 108. Data storage unit 104 may also store other types of data, such as those types described in this disclosure.

Communication interface 106 can allow computing system 100 to connect to and/or communicate with another other entity according to one or more protocols. In an example, communication interface 106 can be a wired interface, such as an Ethernet interface or a high-definition serial-digital-interface (HD-SDI). In another example, communication interface 106 can be a wireless interface, such as a cellular or WI FI interface. A connection can be a direct connection or an indirect connection, the latter being a connection that passes through and/or traverses one or more entities, such as such as a router, switcher, or other network device. Likewise, a transmission can be a direct transmission or an indirect transmission.

User interface 108 can facilitate interaction between computing system 100 and a user of computing system 100, if applicable. As such, user interface 208 can include input components such as a keyboard, a keypad, a mouse, a touch sensitive panel, a microphone, and/or a camera, and/or output components such as a display device (which, for example, can be combined with a touch sensitive panel), a sound speaker, and/or a haptic feedback system. More generally, user interface 108 can include hardware and/or software components that facilitate interaction between computing system 100 and the user of the computing device system.

In some implementations, computing system 100 may serve as a control system for an autonomous or semi-autonomous vehicle, such as a forklift. As such, computing system 100 may receive and process measurements from various sensors positioned on the vehicle and provide control instructions to systems of the vehicle based on the measurements. For instance, computing system 100 may process measurements received from sensors positioned on a portion of the vehicle and adjust operation of the vehicle based on the measurements. In some examples, computing system 100 may operate within a network of computing systems that control operations of an autonomous vehicle.

Figure 2:
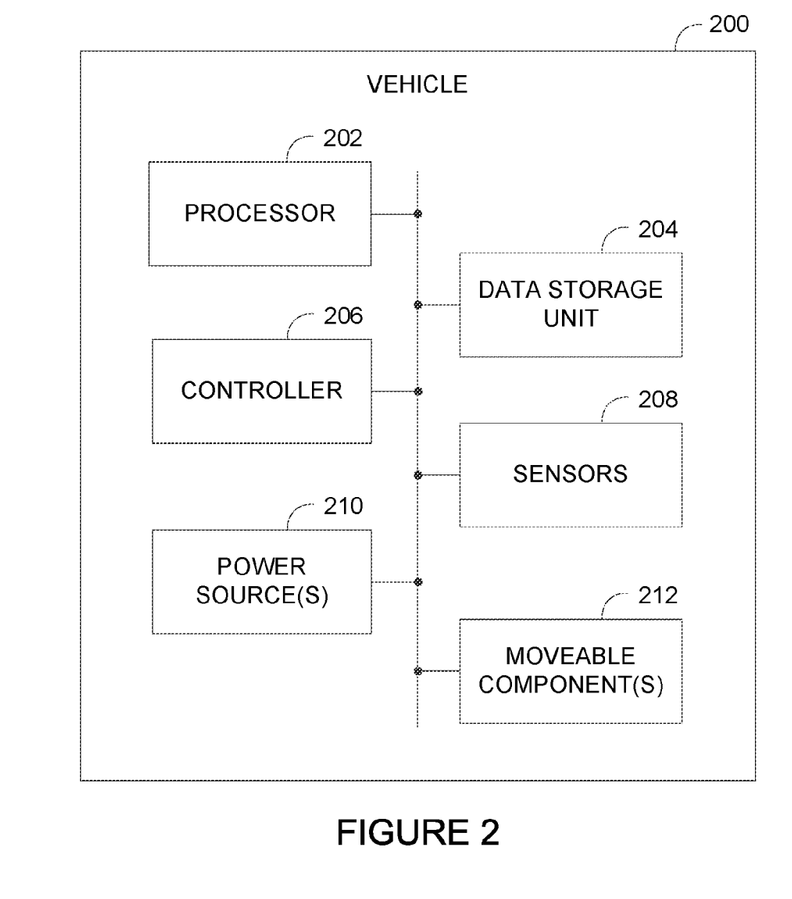
FIG. 2 is a simplified block-diagram of an example robotic device.

FIG. 2 is a simplified block-diagram of an example vehicle 200, which can correspond to a vehicle or robotic device that has a computing ability and interacts with its surroundings. Within examples, vehicle 200 also referred to as a robotic system, robot, machine, etc., may take various configurations, such as an autonomous forklift, among other possible configurations. As shown, vehicle 200 includes processor 202, data storage unit 204, controller 206, sensors 208, power source(s) 210, and movable component(s) 212, but can include more or less components arranged and connected in any manner without departing from the scope of the disclosure.

Processor 202 can correspond to processor 102 and may be a general-purpose processor or a special purpose processor (e.g., digital signal processors, application specific integrated circuits, etc.). For instance, processor 202 can be configured to execute computer-readable program instructions that are stored in data storage unit 204 that are executable to provide the functionality of vehicle 200 described herein. For instance, the program instructions may be executable to provide functionality of controller 206, which may be configured to instruct an actuator to cause movement of one or more movable component(s) 212, among other operations.

Data storage unit 204 may include or take the form of one or more computer-readable storage media that can be read or accessed by processor 202. The one or more computer-readable storage media can include volatile and/or non-volatile storage components, such as optical, magnetic, organic or other memory or disc storage, which can be integrated in whole or in part with processor 202. In some implementations, data storage 204 can be implemented using a single physical device (e.g., one optical, magnetic, organic or other memory or disc storage unit), while in other implementations, data storage 204 can be implemented using two or more physical devices. Further, in addition to the computer-readable program instructions, data storage 204 may include additional data such as diagnostic data, among other possibilities.

Vehicle 200 may include one or more sensors 208 such as force sensors, proximity sensors, load sensors, position sensors, capacitive sensors, touch sensors, depth sensors, ultrasonic range sensors, infrared sensors, Global Positioning System (GPS) receivers, sonar, optical sensors, biosensors, Radio Frequency identification (RFID) sensors, Near Field Communication (NFC) sensors, wireless sensors, compasses, smoke sensors, light sensors, radio sensors, microphones, speakers, radar, cameras (e.g., color cameras, grayscale cameras, and/or infrared cameras), depth sensors (e.g., Red Green Blue plus Depth (RGB-D), lasers, a light detection and ranging (LIDAR) device, a structured-light scanner, and/or a time-of-flight camera), a stereo camera, motion sensors (e.g., gyroscope, accelerometer, inertial measurement unit (IMU), and/or foot step or wheel odometry), and/or range sensors (e.g., ultrasonic and/or infrared), among others. Sensors 208 may provide sensor data to processor 202 to allow for appropriate interaction of vehicle 200 with the environment.

In some implementations, sensor 208 can correspond to multiple sensors positioned along an exterior of a forklift's tines as well as other positions on the forklift. Particularly, these sensors may detect and provide proximity information when the tines are positioned nearby another object. For instance, the sensors may detect the sides of pockets of a pallet during insertion of the tines and relay measurements indicating how close the sides of the tines appear relative to the sides of the pallet's pockets.

Additionally, vehicle 200 may also include one or more power source(s) 210 configured to supply power to various components of vehicle 200. Any type of power source may be used such as, for example, a gasoline engine or a battery. Vehicle 200 may also include one or more actuators, which can produce mechanical motion. In particular, an actuator may be configured to convert stored energy into movement of one or more components. For instance, actuators may be powered by chemicals, compressed air, hydraulics, or electricity, among other possibilities. With this arrangement, actuators may cause movement of various movable component(s) 212, which may include appendages, such as robotic arms or other mechanical structures. For instance, actuators may enable a forklift to lift a pallet off the ground for transportation. Further, moveable component(s) 212 may also include a movable base, wheels, grippers, tools and/or end effectors, among others. In an example implementation, movable component(s) 212 can include tines and mechanisms for manipulating the tines, such as rising and lowering the tines.

Figure 3:
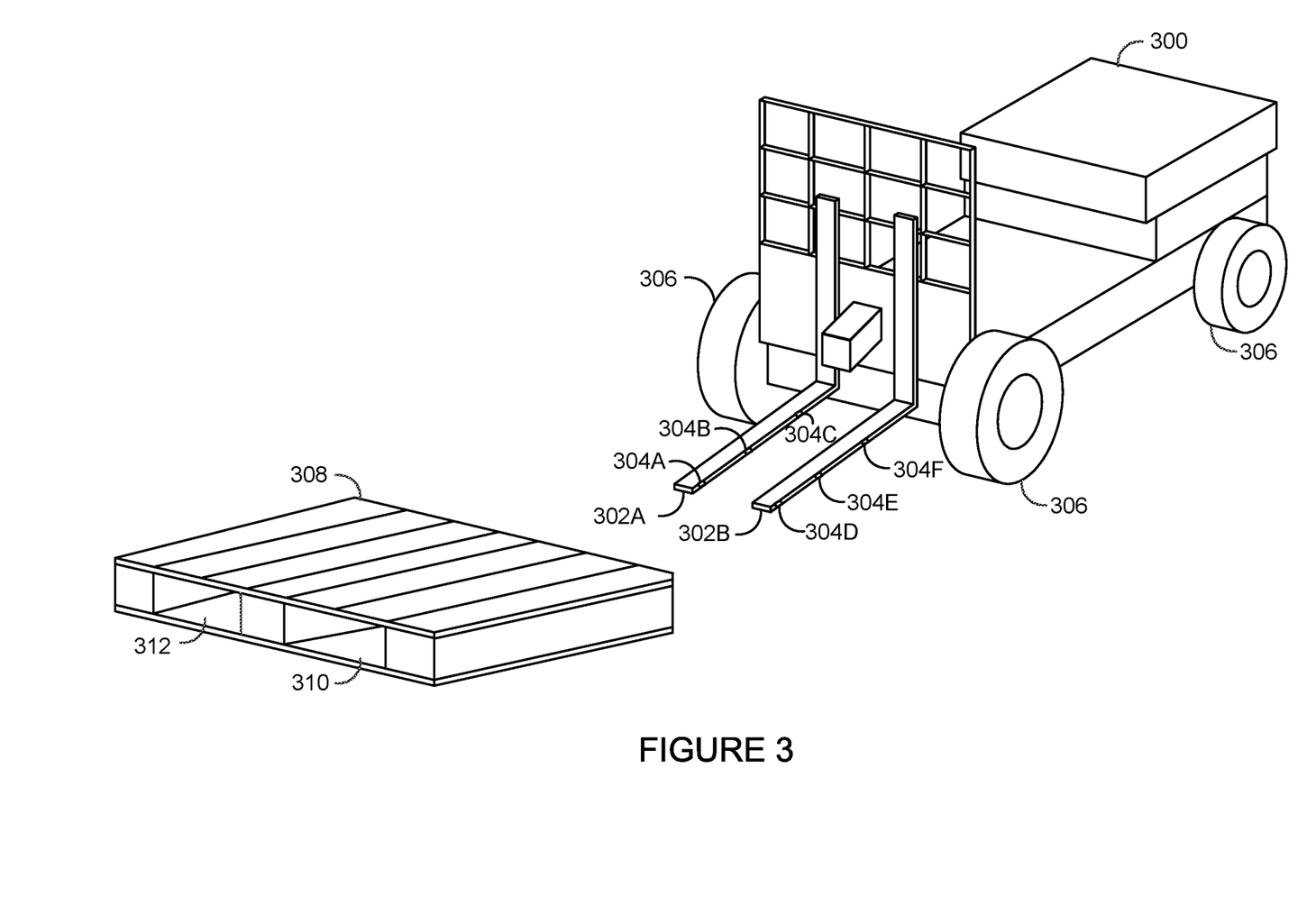
FIG. 3 illustrates an example forklift and pallet.

FIG. 3 shows example forklift 300 that can transport pallet 308. Forklift 300 illustrates one possible representation of an autonomous or semi-autonomous vehicle (e.g., vehicle) that may transport pallet 308 or other objects, but other configurations are possible within implementations. As shown, forklift 300 includes tines 302A, 302B, sensors 304A, 304B, 304C, 304D, 304E, 304F, and wheels 306, among other components.

As indicated above, forklift 300 may transport pallet 308 throughout a space based on controls provided by a control system (e.g., computing system 100). For instance, the control system may receive information from sensors, such as sensors 304A-304F, and determine control instructions for systems of forklift 300 accordingly. Various systems of forklift 300 may perform operations based on instructions provided by the control system. With this configuration or other possible configurations, forklift 300 may autonomously or semi-autonomously perform operations, such as pallet lifting and transportation through measuring the surrounding environment and determining operations accordingly. In some examples, forklift 300 may also include interfaces that enable a human operator to control forklift 300. This way, forklift 300 may perform operations based on inputs provided by the human operator.

Forklift 300 can correspond to various sizes and types of forklifts. In some implementations, the configuration and size of forklift 300 may limit forklift 300 to transport loads (e.g., pallets) up to a specified maximum weight. As such, forklift 300 can have other configurations within examples.

As shown, forklift 300 includes tines 302A, 302B, which are mechanical structures that forklift 300 may use to support and lift objects (e.g., pallets). As an example illustration, forklift 300 may insert tines 302A, 302B into pockets of a pallet to lift and move the pallet to a different location. In some instances, forklift 300 may use tines 302A, 302B to engage a pallet or another object in another manner to transport the pallet or object.

Forklift 300 may elevate tines 302A, 302B using mechanics to reach different levels of a storage rack or other fixed storage structure when moving pallets. For example, forklift 300 may use hydraulics and/or actuators to manipulate tines 302A, 302B to lift and lower a pallet to a desired height. Within implementations, the size, position, and other parameters (e.g., materials) corresponding to tines 302A, 302B can vary. For instance, a forklift may include a single tine or multiple tines in other examples.

As indicated above, tines 302A, 302B can include one or more sensors, such as sensors 304A, 304B, 304C, 304D, 304E, 304F positioned at various points on tines 302A, 302B. For instance, sensors 304A-304F are shown coupled to the inner and outer sides of tines 302A, 302B, but sensors 304A-304F can have other positions within examples. To illustrate, in some examples, sensors may only cover a portion of one or both tines 302A, 302B of forklift 300. For example, tines 302A, 302B may include sensors positioned only along the outer half of the tines positioned away from the base of forklift 300.

In addition to potentially having various layouts and quantities within examples, sensors 304A, 304B, 304C, 304D, 304E, 304F can also correspond to various types of sensors. An example implementation may involve capacitive sensors attached at regular intervals along the outer sides of tines 302A, 302B. In a further implementation, sensors 304A-304F can also be built directly into tines 302A, 302B. For instance, sensors 304A-304F can correspond to capacitive sensors that connect to the exterior of tines 302A, 302B without requiring machining holes into tines 302A, 302B.

Sensors, such as sensors 304A-304F may connect to tines 302A, 302B in various configurations within examples. For instance, sensors use each tine as a circuit ground and receive the needed power to capture measurements through one or more wires (e.g., a wire that connects all the sensors on a single tine).

In another implementation, the sensors can be wired to a digital-to-analog converter (DAC) located near the tine that may be hosted by a microcontroller or computer interface. As such, the DAC may be configured to time division multiplex sensor measurements of multiple sensors. The DAC may also be configured to measure changes in the magnetic field positioned around sensors connected to tines 302A, 302B. Particularly, sensors may detect changes in the magnetic field around tines 302A, 302B when objects are positioned nearby the tines. As a result, the DAC may provide the state of the magnetic field to a computing system that may use the state for determining operations for forklift 300.

In some implementations, a computing system of forklift 300 may utilize software that can use magnetic field measurements to build a model of the obstacles around the forklift's tines. In some instances, the software may improve its model that depicts obstacles around the tines over time through successive measurements from sensors, such as sensors 304A-304F and possibly input from an onboard vehicle localization system (e.g., a vision, odometric, or inertial source). As such, the distances from each tine to various obstacles in the space can be tracked over time and anomalous or undesirable conditions may be detected by the software in order to halt the movement of forklift 300 or alert an operator controlling forklift 300. The software can compare the model of detected obstacles against a simulated model of an expected obstacle (pallet) in order to halt the movement of forklift 300 or alert the operator. The computing system of forklift 300 may also use a determined model to classify a pallet as usable or defective in some examples.

Wheels 306 may enable locomotion of forklift 300. With this configuration, forklift 300 can transport pallets or individual items throughout a space. In some instances, forklift 300 may use rear-wheel steering to enable transportation of heavy loads. Forklift 300 can also use front-wheel steering in other implementations. In a further example, forklift 300 may utilize other mechanical structures to enable locomotion. Additionally, forklift 102 may include other components, such as a motor, power supply, sensor system, etc.

Pallet 308 represents one possible type of pallet that may hold items for forklift 300 to transport. Within implementations, forklift 300 and other vehicles that may operate within a warehouse may be configured to transport pallet 300 or other types of pallets. For instance, pallets can have other configurations for holding items. As shown, pallet 308 includes pocket 310 and pocket 312, but may include other configurations within examples. Forklift 300 may transport pallet 308 by inserting its tines into pockets 310-312. In another implementation, forklift 300 may transport pallet 308 by inserting its tines under portions of pallet 308. As such, forklift 300 may also lift and transport pallets by engaging other portions of the pallet.

Figure 4:
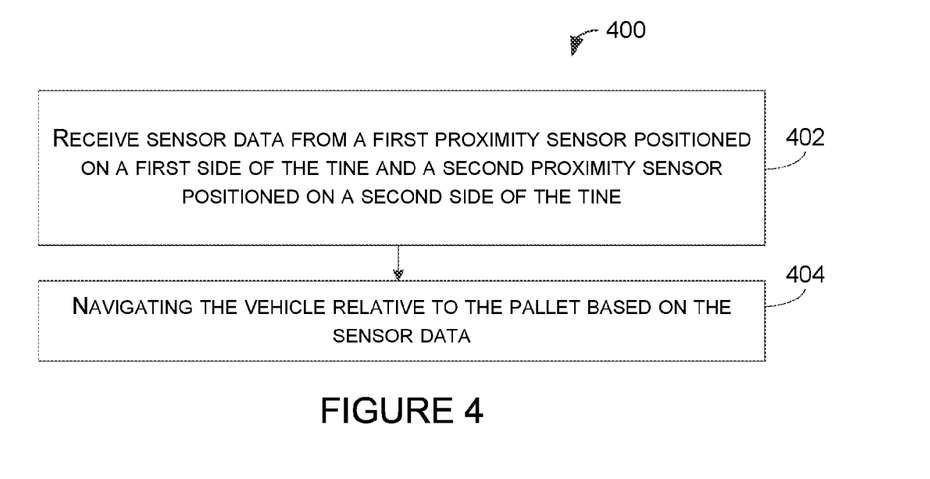
FIG. 4 is a flowchart that shows an example method for pallet detection.

FIG. 4 is a flowchart illustrating method 400 for pallet detection, which represents an example method that may include one or more operations, functions, or actions, as depicted by one or more of blocks 402 and 404, each of which may be carried out by a computing device (e.g., computing system 100), but other systems can also be used. Those skilled in the art will understand that the flowchart described herein illustrate functionality and operation of certain implementations of the present disclosure. In this regard, each block of the flowchart may represent a module, a segment, or a portion of program code, which includes one or more instructions executable by one or more processors for implementing specific logical functions or steps in the process. The program code may be stored on any type of computer readable medium, for example, such as a storage device including a disk or hard drive.

In addition, each block may represent circuitry that is wired to perform the specific logical functions in the process. Alternative implementations are included within the scope of the example implementations of the present application in which functions may be executed out of order from that shown or discussed, including substantially concurrent or in reverse order, depending on the functionality involved, as would be understood by those reasonably skilled in the art. In examples, a computing system may perform one or more blocks of method 500.

At block 402, method 400 includes receiving sensor data from a first proximity sensor positioned on a first side of the tine and a second proximity sensor positioned on a second side of the tine. As indicated above, a forklift (e.g., forklift 300) or another type of vehicle may be configured to transport pallets or other objects throughout a space. In some implementations, the forklift or other type of vehicle may operate in an autonomous or semi-autonomous mode, which may involve performing operations based on instructions from a computing system. The vehicle may perform operations using software and measurements of the surrounding environment, for example.

To assist with the detection of objects, such as pallets, a forklift configured with at least one tine may include one or more sensors positioned on the tine to provide measurements of the objects. For example, one or both of the forklift's tines may include sensors that can be used for near-object detection during the forklift's initial positioning and lifting of the pallet or other item. Other types of vehicles with structures similar to tines may also include sensors that can assist with detecting pallets.

In an example implementation, one or both tines of the forklift may include sensors coupled on the tines (e.g., sides of the tines) that may measure proximity of a pallet's pockets as the forklift inserts the tines into the pallet. For example, a first side of a tine may include at least a first sensor and a second, opposing side of the tine may include at least a second sensor. In another implementation, the first side of the tine may include a plurality of sensors (e.g., proximity sensors) arranged in equally-spaced intervals and the second side of the tine may include another plurality of sensors arranged in equally-spaced intervals. As such, sensors positioned on the tines may capture successive measurements of objects as the tine(s) change distances relative to the objects. In some implementations, the proximity sensors may only detect objects (e.g., portions of a pallet) when the objects are located within a threshold distance from the sensors. With such a configuration, the proximity sensors may provide indications to a computing system when portions of an object or objects are located within a threshold distance from the tine. The sensors may provide successive temporal sets of sensor data to a computing system for processing in some examples.

The sensors may also perform other measurements within examples, such as detecting changes in the magnetic field around the tine due to the presence of objects. For instance, the sensors may measure the magnetic field around the tine and detect changes in the field when an object enters into a position close enough to the tine to alter the magnetic field measurements. As such, the sensors may capture changes in the magnetic field due to objects through successive measurements.

Within other implementations, the types of sensors coupled to the forklift's tines can vary as well as the overall configuration (e.g., positioning) of the sensors. For example, as discussed with regards to forklift 300 in FIG. 3, one or both of a forklift's tines can include capacitive sensors arranged at intervals along the length of each tine. In some implementations, the sensors may be positioned only along the outer sides of a tine. With this configuration, the sensors may capture proximity information of objects positioned nearby the sides of the tine (e.g., opposing sides of a pallet's pocket) as the forklift prepares to lift a pallet.

In another example, a forklift's tine can include sensors positioned on a top surface and bottom surface of the tine that may measure proximity information, such as when the tine engages an object (e.g., a surface of a pallet's pocket) during a lift or the proximity of the tine relative to the ground. A tine can also include sensors positioned at other locations, including one or more sensors positioned on the end portion of the tine.

Referring back to FIG. 4, at block 404, method 400 includes navigating the vehicle relative to the pallet based on the sensor data. A computing system controlling the forklift or other type of vehicle may adjust operations based on incoming sensor data from the sensors positioned on the forklift's tines. For instance, the computing system may cause a navigation system to adjust the orientation and/or position of the forklift and/or tines relative to a pallet. The adjustment can be a slight change in the alignment of the tines with respect to the pallet's pockets or may include larger changes in orientation. For example, some forklifts may use lateral translation of the tines.

In some situations, the computing system may process incoming sensor data and cause the forklift to completely redo the insertion of the tines into the pallet's pockets. The sensor data may indicate that the forklift's tines are positioned a threshold amount off center from a proper position for lifting the pallet. As a result, the computing system may determine that the forklift should back out of the pallet and completely retry inserting the tines at a new orientation and/or position relative to the pallet.

In another implementation, sensors may provide a control system with successive temporal measurements that enables the control system to determine the orientation of the tine as the tine is inserted into a pocket of the pallet. For instance, equally spaced sensors extending along the tines may relay the successive temporal measurements as each sensor detects a portion of the pallet. As such, the control system may adjust the orientation and position of the tine relative to opposing surfaces of the pocket as the vehicle inserts the tine into the pocket. With this configuration, the control system may adjust the orientation and position of the tines relative to the pallet during the insertion process.

The computing system may also use incoming sensor data to determine whether a tine is inserted at least a threshold amount into the pocket of a pallet. Based on determining that the tine is inserted at least the threshold amount, the computing system may cause the vehicle to lift the pallet. The computing system may also cause the vehicle to further insert the tine and/or adjust the orientation or position of the tine within the pocket of the pallet.

In a further implementation, the sensors may provide the sensor data to an interface that a human operator can use to determine adjustments for controlling the forklift. For instance, the forklift may include a visual interface that indicates the distances of the forklift's tines relative to the sides of the pallet's pockets. As such, an operator can use the visual interface to assist in navigating the forklift.

In another implementation, the sensors may provide sensor data to a remote interface that enables a computing system and/or remotely positioned human operator to use for assisting navigation of the forklift. For example, the control system of the forklift may relay uncertainty regarding the pallet pose or condition to a remote operator that can analysis the uncertainty and provide control operations based on the relayed information.

In further implementations, a computing system can use sensor measurements to assist in object and pallet detection in other ways. For instance, the computing system can use sensor measurements as a confirmation that the forklift may proceed with lifting a pallet. The computing system may determine an orientation of the tine relative to the pocket of the pallet based on sensor data from consecutive sensors of a first plurality of proximity sensors and a second plurality of proximity sensors coupled to sides of the tine.

Figure 5A:
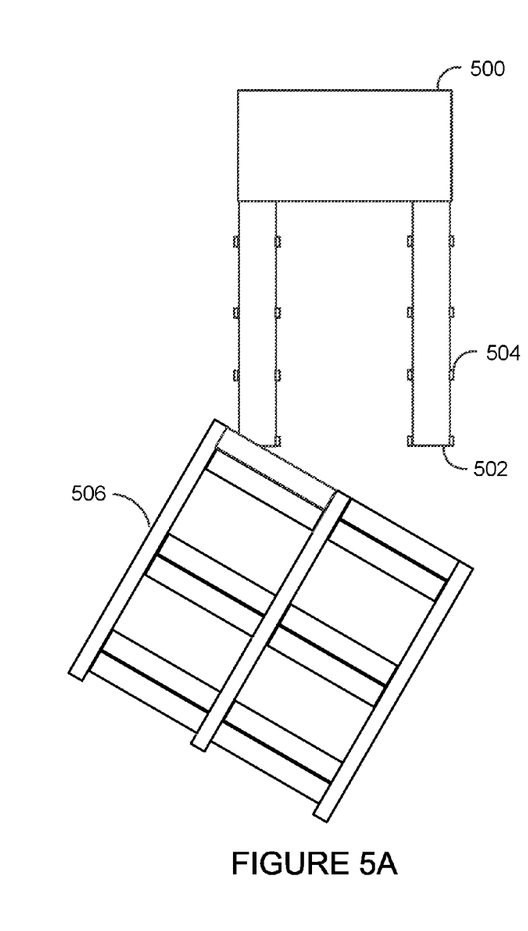
FIG. 5A shows a forklift preparing to lift a pallet, according to an example implementation.

FIGS. 5A, 5B, 5C, and 5D illustrate example pallet detection by forklift 500. More specifically, FIG. 5A shows forklift 500 preparing to lift pallet 506, according to an example implementation. Similar to forklift 300, forklift 500 includes tines (e.g., tine 502) configured with sensors (e.g., sensor 504) that may assist in detecting pallet 506. Although sensors are shown positioned on opposing outer surfaces of the tines, more or less sensors may be positioned on or built into the tines at various locations within other implementations. For instance, in some implementations, tine 502 may include a series of a particular type of sensor or sensors extending along the length of tine 502 that may provide consecutive temporal sensor measurements as each sensor enters into a position capable of detecting a portion of pallet 506.

When a portion of a tine engages pallet 506, sensors (e.g., sensor 504) positioned on the tines may measure proximity of the tines relative to the sides (e.g., opposing surfaces) of the pockets of pallet 506. Depending on the position and orientation of forklift 500, one or more sensors may relay information that indicates the distances between the tines and portions of the pockets.

In some implementations, the tines may include sensors configured to measure the magnetic field proximate to the tines. Particularly, the sensors may detect when a portion or portions of pallet 506 enter into a position close enough to the tines to influence the magnetic field around the tines. Since objects, such as portions of pallet 506 may cause some types of sensors coupled to the tines of the forklift to detect changes in the magnetic field, a computing system may develop a model or process that enables the system to determine when objects enter nearby the tines based on the detection of changes in the magnetic field. The sensors may relay other information that can enhance the overall detection or manipulation of pallet 506 by forklift 500 in other implementations.

As shown in FIG. 5A, sensors positioned on the end of one of the tines of forklift 500 may initially detect a portion of pallet 506 due to the overall orientation and position of forklift 500. A computing system may receive measurements from some sensors prior to receiving measurements from other sensors coupled to the tines. As such, the computing system may adjust the navigation of forklift 500 during the insertion process, including changing the orientation or position of the tines as forklift 500 inserts the tines into the pockets of pallet 506. For instance, the control system may cause forklift 500 to backup and re-enter pallet 506 so that both tines are engaging the pockets of pallet 506.

Figure 5B:
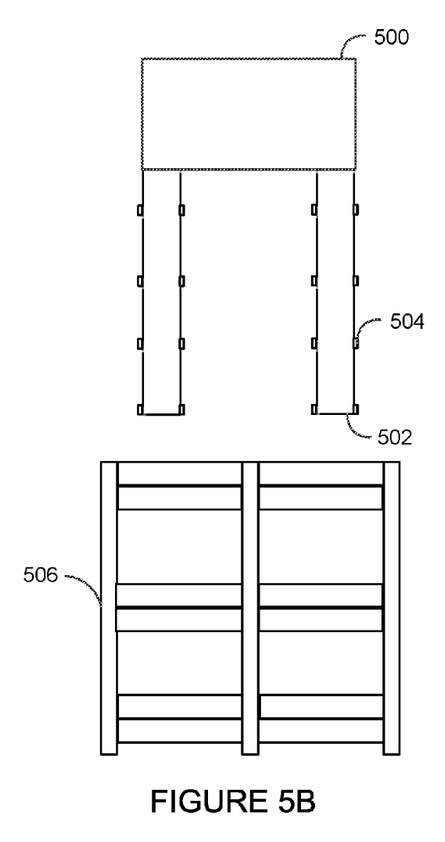
FIG. 5B shows a situation where the forklift of FIG. 5A may adjust orientation relative to the pallet, according to the example implementation.

FIG. 5B shows a situation where forklift 500 of FIG. 5A may adjust orientation relative to pallet 506, according to the example implementation. Particularly, forklift 500 is shown in a new position relative to pallet 506 that may enable forklift 500 to reposition its tines in the pockets of pallet 506. The computing system may have adjusted the orientation and position of forklift 500 after receiving indications from some sensors positioned on the tines that only one tine was detecting a pocket of pallet 506. In another example, the computing system may have caused forklift 500 to adjust the orientation or position of the tines without completely removing the tines from the pockets of pallet 506.

Figure 5C:
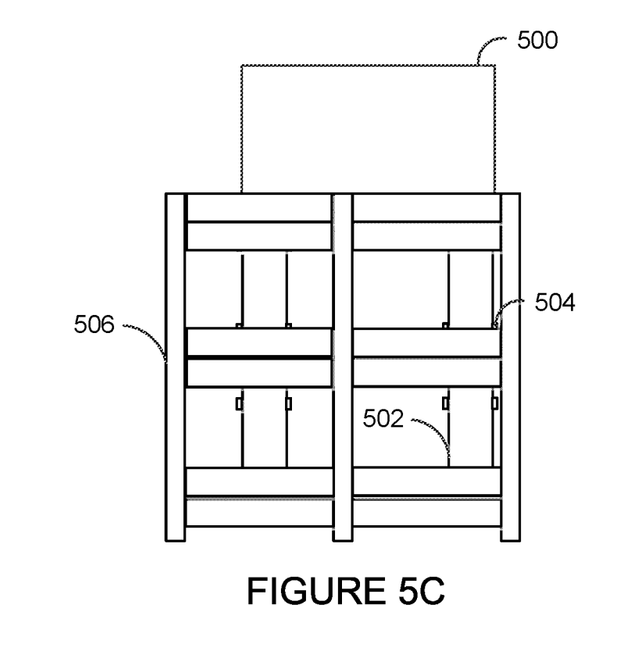
FIG. 5C shows another situation where the forklift of FIG. 5A may adjust orientation relative to the pallet, according to the example implementation.

FIG. 5C shows another situation where forklift 500 of FIG. 5A may adjust orientation relative to pallet 506, according to the example implementation. More specifically, FIG. 5C shows tine 502 of forklift 500 positioned closely to one side of a pocket of pallet 506 and the other tine of forklift 500 positioned in the approximate center of the other pocket of pallet 506.

Sensors coupled to the tines may relay measurements to a control system of forklift 500 that can use the measurements to determine whether or not to change orientation or position relative to pallet 506. In some instances, the control system may determine that forklift 500 should adjust its position relative to pallet 506 to prevent potential damage to pallet 506 or items during the initial lift. In another implementation, the measurements may indicate that the forklift 500 may proceed with lifting pallet 506.

In a further implementation, the control system may determine whether or not to lift pallet 506 in the current position based on prior measurements and operations by forklift 500 or other forklifts. For instance, the control system may use past performances and measurements to determine during subsequent situations when the tines are positioned in a manner that allows safe transportation.

Figure 5D:
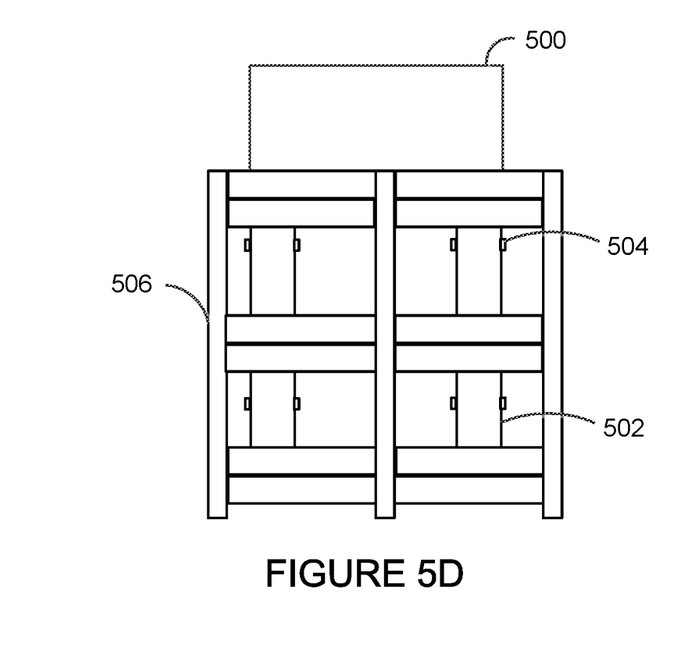
FIG. 5D shows the forklift of FIG. 5A in a balanced position for lifting the pallet, according to the example implementation.

FIG. 5D shows forklift 500 of FIG. 5A in a balanced position for lifting pallet 506, according to the example implementation. As shown in FIG. 5D, forklift 500 is positioned with its tines located in the pockets of pallet 506. In this position, sensors connected to the tines may indicate that the tines are positioned with enough space from opposing sides of the pockets of pallet 506 to enable a balanced lift of pallet 506. As a result, the control system may receive the measurements and responsively cause forklift 500 to lift and transport pallet 506.

The present disclosure is not to be limited in terms of the particular implementations described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example implementations described herein and in the figures are not meant to be limiting. Other implementations can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

The particular arrangements shown in the figures should not be viewed as limiting. It should be understood that other implementations can include more or less of each element shown in a given figure. Further, some of the illustrated elements can be combined or omitted. Yet further, an example implementation can include elements that are not illustrated in the figures.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims.

The invention claimed is:

1. A system comprising:
    a vehicle comprising a base;
    a tine coupled to the base, wherein the tine includes a first proximity sensor positioned on a first side of the tine and a second proximity sensor positioned on a second side of the tine; and
    a computing system configured to:
        receive, from the first proximity sensor and the second proximity sensor, sensor data indicative of proximity of the tine relative to opposing surfaces of a pocket of a pallet; and
        navigate the vehicle relative to the pallet based on the sensor data.

2. The system of claim 1, wherein the vehicle is configured to operate in an autonomous mode.

3. The system of claim 1, wherein the computing system is further configured to cause the vehicle to insert the tine into the pocket of the pallet to lift and transport the pallet.

4. The system of claim 1, wherein the first proximity sensor and the second proximity sensor are capacitive sensors.

5. The system of claim 1, wherein the first proximity sensor and the second proximity sensor use the tine as a ground.

6. The system of claim 1, wherein the computing system is operable to cause the vehicle to change orientation of the tine relative to the pallet based on the sensor data.

7. The system of claim 1, wherein the tine further includes a first plurality of proximity sensors arranged in equally-spaced intervals on the first side of the tine and a second plurality of proximity sensors arranged in equally-spaced intervals on the second side of the tine.

8. The system of claim 7, wherein the computing system is further configured to determine an orientation of the tine relative to the pocket of the pallet based on sensor data from consecutive sensors of the first plurality of proximity sensors and the second plurality of proximity sensors.

9. A method comprising:
    receiving, at a computing system controlling a vehicle that comprises a base and a tine coupled to the base, sensor data from a first proximity sensor positioned on a first side of the tine and a second proximity sensor positioned on a second side of the tine, wherein the sensor data is indicative of proximity of the tine relative to opposing surfaces of a pocket of a pallet; and
    navigating, by the computing system, the vehicle relative to the pallet based on the sensor data.

10. The method of claim 9, wherein navigating the vehicle relative to the pallet based on the sensor data comprises:
    causing the vehicle to adjust an orientation of the tine relative to the opposing surfaces of the pocket of the pallet.

11. The method of claim 9, wherein navigating the vehicle relative to the pallet based on the sensor data comprises:
    adjusting a position of the tine relative to the opposing surfaces of the pocket of the pallet.

12. The method of claim 9, wherein navigating the vehicle relative to the pallet based on the sensor data comprises:
    determining whether the tine is inserted at least a threshold amount in the pocket of the pallet; and
    based on a determination that the tine is inserted at least the threshold amount in the pocket of the pallet, causing the vehicle to lift the pallet.

13. The method of claim 9, wherein navigating the vehicle relative to the pallet based on the sensor data comprises:
    causing the vehicle to adjust orientation of the tine relative to opposing surfaces of the pocket of the pallet based on the sensor data indicating that the first side or the second side of the tine is within a threshold distance of a respective surface of the pocket of the pallet.

14. The method of claim 9, wherein receiving sensor data from the first proximity sensor positioned on the first side of the tine and the second proximity sensor positioned on the second side of the tine comprises:
    receiving successive temporal sets of sensor data from the first proximity sensor and the second proximity sensor.

15. The method of claim 14, wherein navigating the vehicle relative to the pallet based on the sensor data comprises:
    determining an orientation of the tine relative to opposing surfaces of the pocket of the pallet based on the successive temporal sets of sensor data; and
    based on determining the orientation of the tine, causing the vehicle to adjust orientation of the tine relative to the opposing surfaces of the pocket of the pallet.

16. The method of claim 9, wherein receiving sensor data from the first proximity sensor positioned on the first side of the tine and the second proximity sensor positioned on the second side of the tine comprises:
    receiving sensor data from a first plurality of sensors arranged in intervals on the first side of the tine and a second plurality of sensors arranged in intervals on the second side of the tine, wherein the first plurality of sensors includes the first proximity sensor and the second plurality of sensors includes the second proximity sensor.

17. The method of claim 16, wherein navigating the vehicle relative to the pallet based on the sensor data comprises:
    determining an orientation of the tine relative to the opposing surfaces of the pocket of the pallet based on sensor data from consecutive sensors of the first plurality of sensors and the second plurality of sensors; and navigating the vehicle based on the determined orientation of the tine relative to the opposing surfaces of the pocket of the pallet.

18. A non-transitory computer-readable medium configured to store instructions, that when executed by one or more processors, cause a computing system to perform functions comprising:

receiving, from a first proximity sensor positioned on a first side of a tine and a second proximity sensor positioned on a second side of a tine, sensor data indicative of proximity of the tine relative to opposing surfaces of a pocket of a pallet, wherein the tine is coupled to a base of a vehicle; and navigating the vehicle relative to the pallet based on the sensor data.

19. The non-transitory computer readable medium of claim 18, wherein receiving sensor data indicative of proximity of the tine relative to opposing surfaces of a pocket of a pallet comprises:

receiving successive temporal sets of sensor data from the first proximity sensor and the second proximity sensor.

20. The non-transitory computer readable medium of claim 18, wherein the first proximity sensor and the second proximity sensor are capacitive sensors operable to measure changes in a magnetic field proximate to the tine.

* * * * *